(12) United States Patent
Naiki et al.

(10) Patent No.: US 11,355,114 B2
(45) Date of Patent: Jun. 7, 2022

(54) AGENT APPARATUS, AGENT APPARATUS CONTROL METHOD, AND STORAGE MEDIUM

(71) Applicant: HONDA MOTOR CO., LTD., Tokyo (JP)

(72) Inventors: Kengo Naiki, Wako (JP); Mototsugu Kubota, Wako (JP); Sawako Furuya, Wako (JP); Yoshifumi Wagatsuma, Wako (JP); Toshikatsu Kuramochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 16/826,490

(22) Filed: Mar. 23, 2020

(65) Prior Publication Data

US 2020/0321001 A1    Oct. 8, 2020

(30) Foreign Application Priority Data

Mar. 25, 2019  (JP) .............................. JP2019-055984

(51) Int. Cl.
*G10L 15/22*        (2006.01)
(52) U.S. Cl.
CPC ................... *G10L 15/22* (2013.01)

(58) Field of Classification Search
CPC ........................................................ G10L 15/22
See application file for complete search history.

(56) References Cited

U.S. PATENT DOCUMENTS

| | | | | |
|---|---|---|---|---|
| 2014/0270243 | A1* | 9/2014 | Bennett | A61B 5/742 381/86 |
| 2018/0096675 | A1* | 4/2018 | Nygaard | G10L 13/04 |

FOREIGN PATENT DOCUMENTS

JP    2006-335231    12/2006

\* cited by examiner

*Primary Examiner* — Ibrahim Siddo
(74) *Attorney, Agent, or Firm* — Amin, Turocy & Watson, LLP

(57) ABSTRACT

An agent apparatus includes a plurality of agent function portions each providing a service including outputting a voice response from an output in response to an occupant's speech in a vehicle, and a selector referring to history information indicating a history of a quality of a service executed by each of the plurality of agent function portions with respect to a content of the occupant's speech, and selecting an agent function portion making a response to the occupant's speech in the vehicle from among the plurality of agent function portions.

8 Claims, 12 Drawing Sheets

| AGENT | SERVICE | QUALITY OF SERVICE | | |
|---|---|---|---|---|
| | | RESPONSE TIME | INFORMATION AMOUNT | CERTAINTY FACTOR |
| AGENT 1 | MAP RETRIEVAL FUNCTION | SHORT | LARGE | HIGH |
| AGENT 1 | WEATHER REPORT FUNCTION | SHORT | LARGE | HIGH |
| AGENT 1 | INFORMATION RETRIEVAL FUNCTION | SHORT | LARGE | HIGH |
| AGENT 2 | MAP RETRIEVAL FUNCTION | NORMAL | NORMAL | NORMAL |
| AGENT 2 | WEATHER REPORT FUNCTION | – | – | – |
| AGENT 2 | INFORMATION RETRIEVAL FUNCTION | NORMAL | NORMAL | NORMAL |
| AGENT 3 | MAP RETRIEVAL FUNCTION | LONG | SMALL | LOW |
| AGENT 3 | WEATHER REPORT FUNCTION | LONG | SMALL | LOW |
| AGENT 3 | INFORMATION RETRIEVAL FUNCTION | – | – | – |
| ... | ... | ... | ... | ... |

FIG. 11
| AGENT | SERVICE |
|---|---|
| AGENT 1 | MAP RETRIEVAL FUNCTION |
| AGENT 2 | TRAFFIC INFORMATION PROVIDING FUNCTION |
| AGENT 3 | FORTUNE-TELLER FUNCTION |
| ... | ... |
166
FIG. 12
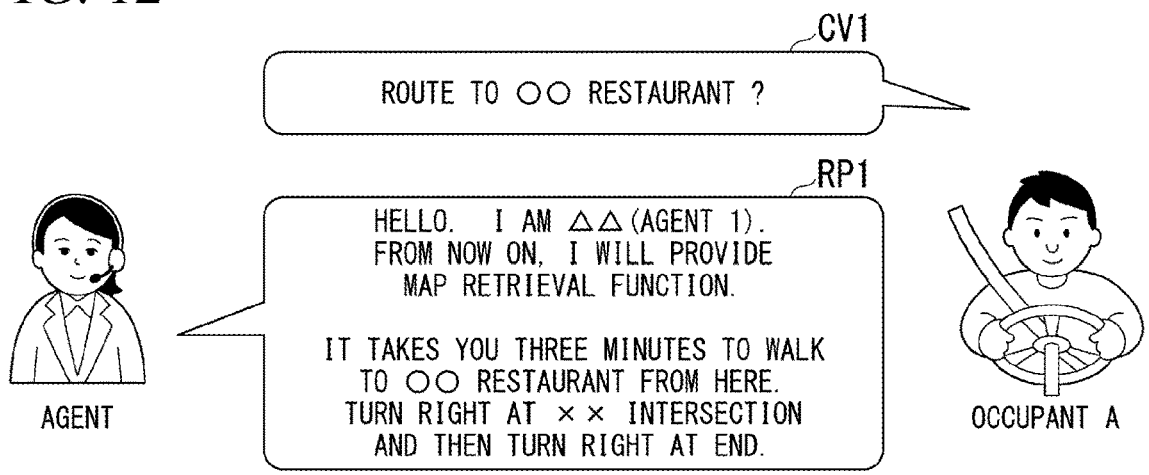
FIG. 13
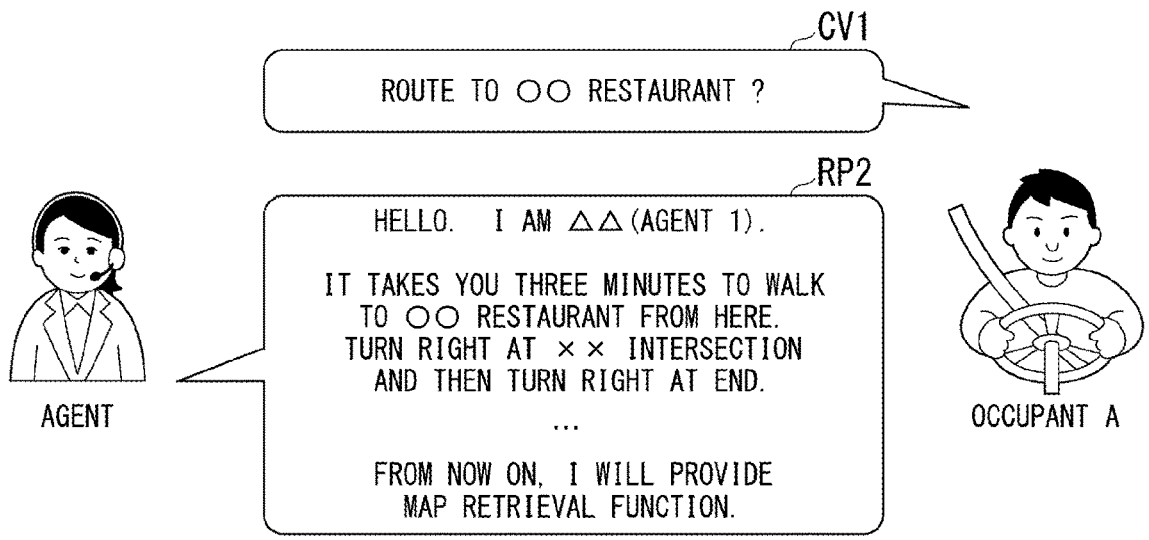

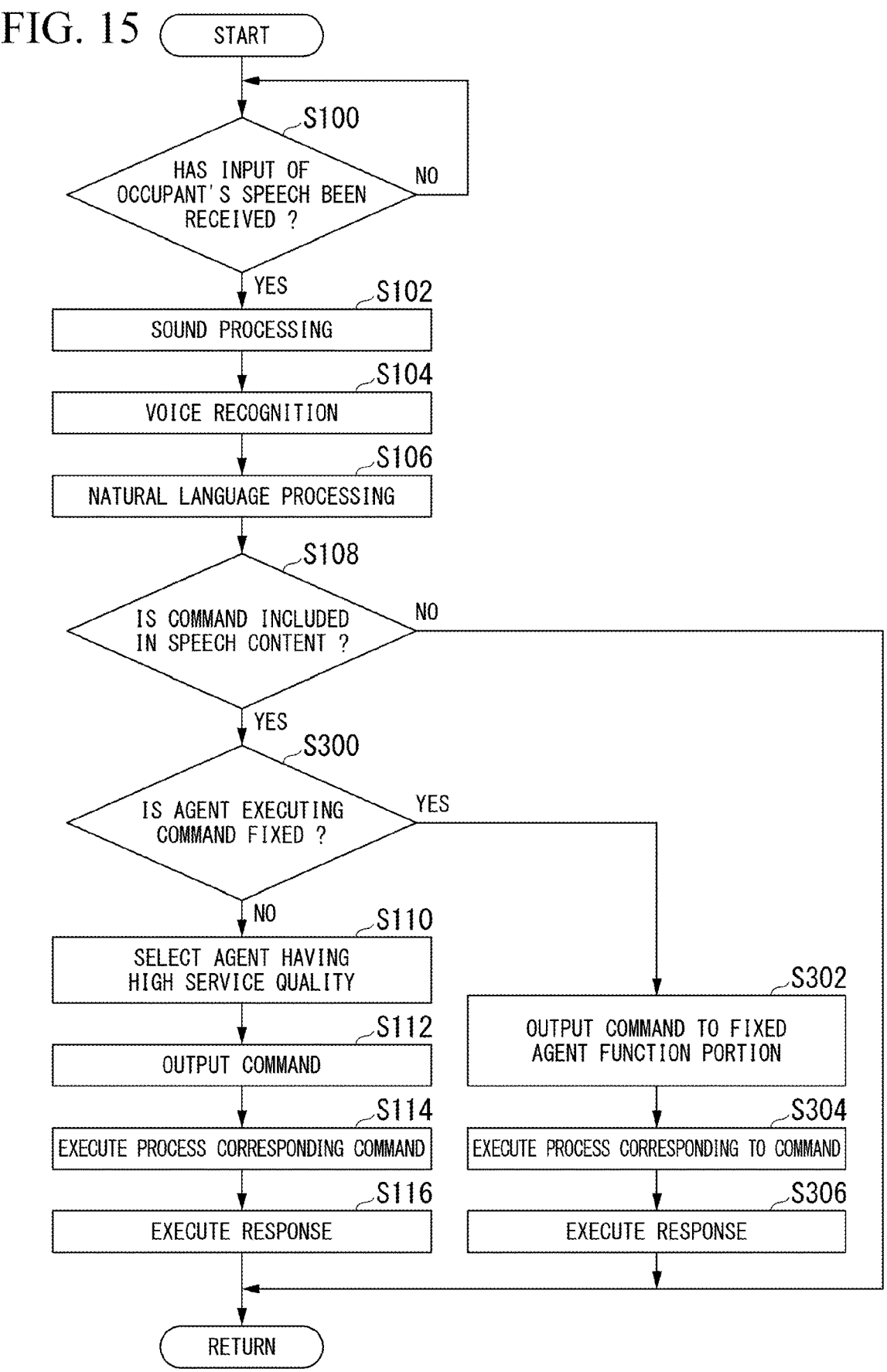

AGENT APPARATUS, AGENT APPARATUS CONTROL METHOD, AND STORAGE MEDIUM

CROSS-REFERENCE TO RELATED APPLICATION

Priority is claimed on Japanese Patent Application No. 2019-055984, filed Mar. 25, 2019, the content of which is incorporated herein by reference.

BACKGROUND

Field of the Invention

The present invention relates to an agent apparatus, an agent apparatus control method, and a storage medium.

Description of Related Art

In the related art, there is a technique regarding an agent function of providing information regarding driving assistance or vehicle control corresponding to a request from an occupant, and other applications, while having a dialogue with the occupant of the vehicle (for example, Japanese Unexamined Patent Application, First Publication No. 2006-335231).

SUMMARY

In recent years, installing a plurality of agent functions in a vehicle has been put into practical use, but, even in a case where a plurality of agents are used, an occupant is required to call one agent and deliver a request thereto. Thus, when the occupant does not recognize a feature of each agent, the occupant may not call an agent most suitable to execute a process corresponding to a request and thus may not obtain an appropriate result.

Aspects of the present invention have been made in consideration of these circumstances, and an object thereof is to provide an agent apparatus, an agent apparatus control method, and a storage medium capable of providing a more appropriate response result.

An agent apparatus, an agent apparatus control method, and a storage medium according to the invention employ the following configurations.

(1): According to an aspect of the present invention, there is provided an agent apparatus including a plurality of agent function portions each providing a service including outputting a voice response from an output in response to an occupant's speech in a vehicle; and a selector referring to history information indicating a history of a quality of a service executed by each of the plurality of agent function portions with respect to a content of the occupant's speech, and selecting an agent function portion making a response to the occupant's speech in the vehicle from among the plurality of agent function portions.

(2): In the aspect of the above (2), the history information has a record including a content of an executed service, an agent function portion as a provision source, and information indicating a quality of the service, and the selector is configured to select the agent function portion corresponding to a record in which a quality of the service is high among records in which information indicating the occupant's speech is coincident with an executed service, as an agent function portion making a response to the occupant's speech in the vehicle by outputting the voice response from the output.

(3): In the aspect of the above (1) or (2), the agent apparatus further includes a notification controller notifying the occupant of various pieces of information by using the output, the selector is configured to transition from a state of dynamically selecting the agent function portion to a state of fixedly selecting the agent function portion on the basis of the history information, the agent function portion starting to provide a service in response to a certain speech, and the notification controller is configured to notify the occupant of the agent function portion that is fixed to be fixedly selected by the selector, by using the output.

(4): In the aspect of the above (3), the notification controller is configured to notify the occupant of the agent function portion that is fixed to be fixedly selected by the selector, by using the output, between the occupant's speech and provision of the service.

(5): In the aspect of the above (3) or (4), the notification controller is configured to notify the occupant of the agent function portion that is fixed to be fixedly selected by the selector, by using the operation portion, after the service is provided.

(6): In the aspect of any one of the above (3) to (5), a phrase used for starting is set for each of the plurality of agent function portions, and, in a case where the agent function portion providing a service requested according to a part other than the phrase is fixed in the occupant's speech although the phrase is included in the occupant's speech, the selector is configured to select the fixed agent function portion as an agent function portion making a response to the occupant's speech in the vehicle.

(7): In the aspect of any one of the above (1) to (5), a phrase used for starting is set for each of the plurality of agent function portions, and the selector is configured to select the agent function portion in a case where the phrase is not included in the occupant's speech.

(8): According to another aspect of the present invention, there is provided an agent apparatus control method of causing a computer to start a plurality of agent function portions each providing a service including outputting a voice response from an output in response to an occupant's speech in a vehicle; refer to history information indicating a history of a quality of a service executed by each of the plurality of agent function portions with respect to a content of the occupant's speech; and select an agent function portion making a response to the occupant's speech in the vehicle from among the plurality of agent function portions.

(9): According to still another aspect of the present invention, there is provided a storage medium storing a program causing a computer to start a plurality of agent function portions each providing a service including outputting a voice response from an output in response to an occupant's speech in a vehicle; refer to history information indicating a history of a quality of a service executed by each of the plurality of agent function portions with respect to a content of the occupant's speech; and select an agent function portion making a response to the occupant's speech in the vehicle from among the plurality of agent function portions.

According to the aspects of the above (1) to (9), it is possible to provide a more appropriate response result.

BRIEF DESCRIPTION OF THE DRAWINGS

FIG. 6 is a diagram showing examples of contents of history information.

FIG. 11 is a diagram showing examples of contents of fixed agent information.

FIG. 12 is a diagram showing an example of a dialogue to introduce a fixed agent between an occupant's speech and provision of a service.

FIG. 13 is a diagram showing an example of a dialogue to introduce a fixed agent after a service is provided.

FIG. 15 is a flowchart showing a series of flows of an operation of the agent apparatus according to the second embodiment.

DETAILED DESCRIPTION OF THE INVENTION

Hereinafter, a description will be made of an agent apparatus, an agent apparatus control method, and a storage medium according to embodiments of the present invention with reference to the drawings. The agent apparatus is an apparatus realizing a part or the whole of an agent system. Hereinafter, as an example of the agent apparatus, a description will be made of an agent apparatus mounted on a vehicle (hereinafter, a vehicle M) and having a plurality of types of agent functions. The agent functions are, for example, functions of providing various pieces of information based on requests (commands) included in an occupant's speech or relaying a network service while having a dialogue with the occupant of the vehicle M. A plurality of types of agents may be different from each other in terms of performed functions, processing procedures, control, and output aspects and contents. The agent functions may include a function of controlling equipment (for example, equipment related to driving control or vehicle body control) of the vehicle.

The agent functions are realized by integrally using, for example, a natural language processing function (a function of understanding a structure or semantics of text), a dialogue management function, and a network search function of searching other apparatuses via a network or searching a predetermined database of a host apparatus in addition to a voice recognition function (a function of generating speech as text) of recognizing the speech of an occupant. Some or all of the functions may be realized by an artificial intelligence (AI) technique. Some constituents for performing the functions (particularly, a voice recognition function or a natural language processing/analyzing function) may be mounted on an agent server (external apparatus) that can perform communication with an on-vehicle communication apparatus of the vehicle M or a general-purpose communication apparatus brought into the vehicle M. In the following description, it is assumed that some constituents are mounted on the agent server, and the agent system is realized in cooperation between the agent apparatus and the agent server. A service providing entity (service entity) that virtually appears in cooperation between the agent apparatus and the agent server will be referred to as an agent.

First Embodiment

Overall Configuration

Figure 1:
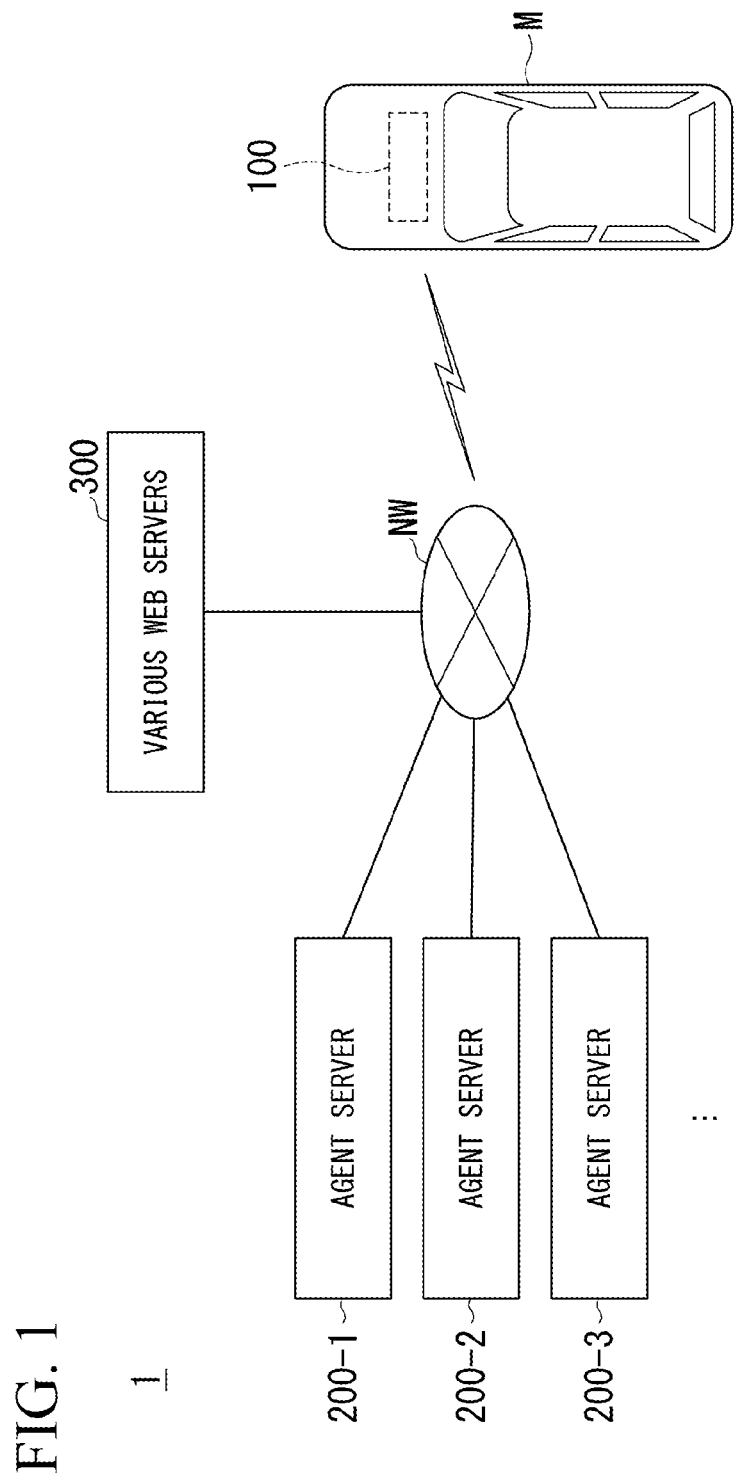
FIG. 1 is a diagram showing a configuration of an agent system including an agent apparatus according to a first embodiment.

FIG. 1 is a diagram showing a configuration of an agent system 1 including an agent apparatus 100 according to a first embodiment. The agent system 1 includes, for example, the agent apparatus 100 and a plurality of agent servers 200-1, 200-2, 200-3, .... The numbers following the hyphen at the ends of the reference numerals are identifiers for differentiating the agent servers from each other. When the agent servers are not differentiated from each other, the agent servers will be simply referred to as agent servers 200 in some cases. FIG. 1 shows three agent servers 200, but the number of agent servers 200 may be two or four or more. The respective agent servers 200 are operated by, for example, providers of different agent systems. Therefore, agents in the present embodiment are agents realized by different providers. The providers may be, for example, a car manufacturer, a network service business operator, a business entity handling electronic commerce, and a seller or a manufacturer of a portable terminal, and any entity (a corporation, an organization, an individual, or the like) may be a provider of the agent system.

The agent apparatus 100 performs communication with the agent servers 200 via a network NW. The network NW includes some or all of, for example, the Internet, a cellular network, a Wi-Fi network, a wide area network (WAN), a local area network (LAN), a public line, a telephone line, and a wireless base station. Various web servers 300 are connected to the network NW, and the agent server 200 or the agent apparatus 100 may acquire a web page from the various web servers 300 via the network NW.

The agent apparatus 100 has a dialogue with an occupant of the vehicle M, transmits speech from the occupant to the agent server 200, and presents an answer obtained from the agent server 200 to the occupant in the form of voice output or image display.

First Embodiment

Vehicle

Figure 2:
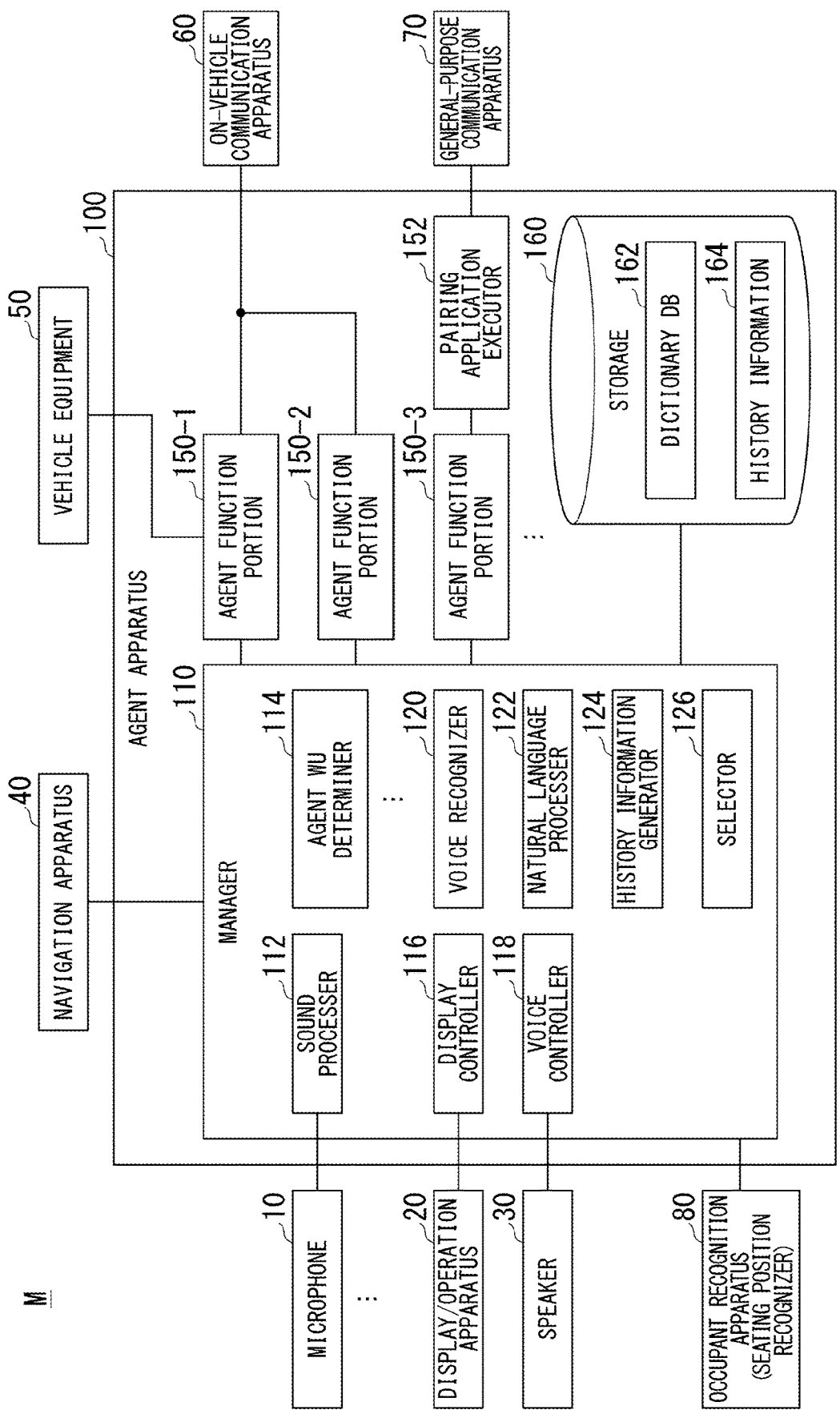
FIG. 2 is a diagram showing a configuration of the agent apparatus according to the first embodiment and equipment mounted on a vehicle.

FIG. 2 is a diagram showing a configuration of the agent apparatus 100 according to the first embodiment and equipment mounted on the vehicle M. The vehicle M is mounted with, for example, one or more microphones 10, a display/operation apparatus 20, a speaker 30, a navigation apparatus 40, vehicle equipment 50, an on-vehicle communication apparatus 60, an occupant recognition apparatus 80, and the agent apparatus 100. A general-purpose communication apparatus 70 such as a smartphone may be brought into a vehicle cabin, to be used as a communication apparatus. The apparatuses are connected to each other via a multiplex communication line such as a Controller Area Network (CAN) communication line, a serial communication line, or a wireless communication line. The constituent elements shown in FIG. 2 are only examples, and some of the constituent elements may be omitted, and other constituent elements may be added.

The microphone 10 is a sound collecting portion that collects sound generated in the vehicle cabin. The display/operation apparatus 20 is an apparatus (or an apparatus group) that can display an image and can also receive an input operation. The display/operation apparatus 20 includes, for example, a display device formed of a touch panel. The display/operation apparatus 20 may further include a head-up display (HUD) or a mechanical input device. The speaker 30 includes, for example, a plurality of speakers (sound outputs) disposed at different positions in the vehicle cabin. The display/operation apparatus 20 may be shared by the agent apparatus 100 and the navigation apparatus 40. Details thereof will be described later.

The navigation apparatus 40 includes a navigation human machine interface (HMI), a positioning device such as a global positioning system (GPS), a storage device storing map information, and a control device (navigation controller) performing route retrieval. Some or all of the microphones 10, the display/operation apparatus 20, and the speaker 30 may be used as the navigation HMI. The navigation apparatus 40 retrieves a route (navigation route) for movement from a position of the vehicle M identified by the positioning device to a destination that is input by the occupant, and outputs guidance information by using the navigation HMI such that the vehicle M can travel along the route. The route retrieval function may be installed in a navigation server that is accessible via the network NW. In this case, the navigation apparatus 40 acquires a route from the navigation server, and outputs guidance information. The agent apparatus 100 may be built on the basis of a navigation controller, and, in this case, the navigation controller and the agent apparatus 100 are integrally configured with each other in hardware.

The vehicle equipment 50 includes, for example, a driving force output device such as an engine or a motor for traveling, an engine starting motor, a door lock device, a door opening/closing device, windows, a window opening/closing device, a window opening/closing control device, seats, a seat position control device, an interior mirror, an interior mirror angular position control device, inner and outer lighting devices of the vehicle and control devices therefor, wipers, defoggers, and control devices therefor, direction indicator lamps and control devices therefor, an air conditioning device, and a vehicle information device providing information regarding a traveling distance or air pressure of the tires or information regarding a remaining fuel quantity.

The on-vehicle communication apparatus 60 is a wireless communication apparatus that can access the network NW by using, for example, a cellular network or a Wi-Fi network.

The occupant recognition apparatus 80 includes, for example, seating sensors, a camera in the vehicle cabin, and an image recognition device. The seating sensors include pressure sensors provided on lower parts of seats and tension sensors provided at seat belts. The camera in the vehicle cabin is a charge coupled device (CCD) camera or a complementary metal oxide semiconductor (CMOS) camera provided in the vehicle cabin. The image recognition device analyzes an image from the camera in the vehicle cabin, and thus recognizes the presence or absence of an occupant for each seat, a face orientation, and the like.

Figure 3:
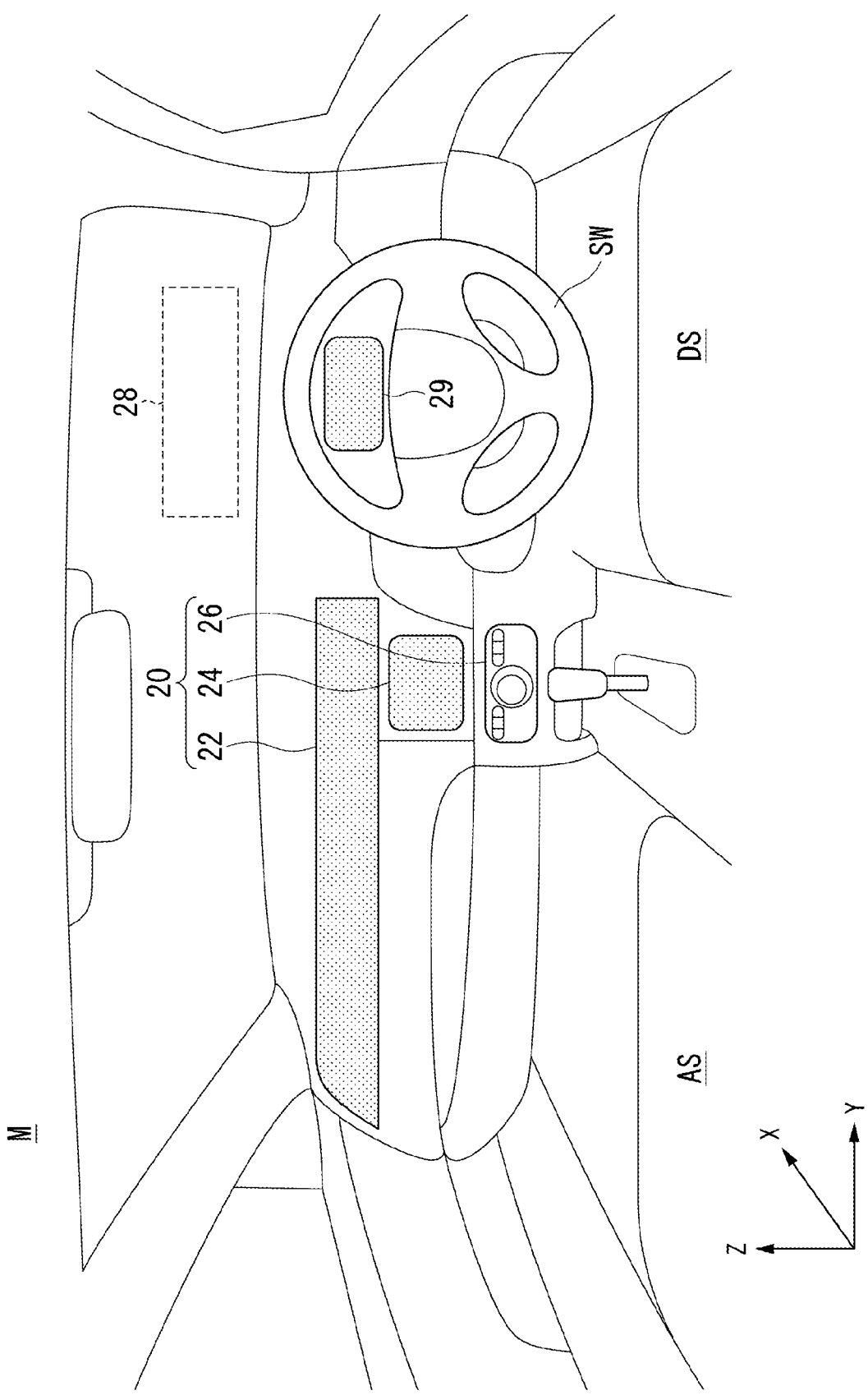
FIG. 3 is a diagram showing an example of disposition of a display/operation apparatus and a speaker.

FIG. 3 is a diagram showing an example of disposition of the display/operation apparatus 20 and the speaker 30. The display/operation apparatus 20 includes, for example, a first display 22, a second display 24, and an operation switch assembly 26. The display/operation apparatus 20 may further include a HUD 28. The display/operation apparatus 20 may further include a meter display 29 provided on a portion facing a driver seat DS in an instrument panel. A combination of the first display 22, the second display 24, the HUD 28, and the meter display 29 is an example of a "display".

For example, there are the driver seat DS in which a steering wheel SW is provided, and a passenger seat AS provided in a vehicle width direction (a Y direction in FIG. 3) with respect to the driver seat DS in the vehicle M. The first display 22 is a display device that has a horizontally long shape and extends from near an intermediate position between the driver seat DS and the passenger seat AS to a position facing a left end of the passenger seat AS in the instrument panel. The second display 24 is provided at an intermediate position in the vehicle width direction between the driver seat DS and the passenger seat AS under the first display. For example, each of the first display 22 and the second display 24 is formed of a touch panel, and includes a liquid crystal display (LCD), an organic electroluminescence (EL) display, or a plasma display as a display. The operation switch assembly 26 is an assembly into which dial switches or button switches are integrated. The display/operation apparatus 20 outputs the details of an operation performed by an occupant to the agent apparatus 100. A content to be displayed on the first display 22 or the second display 24 may be determined by the agent apparatus 100.

Figure 4:
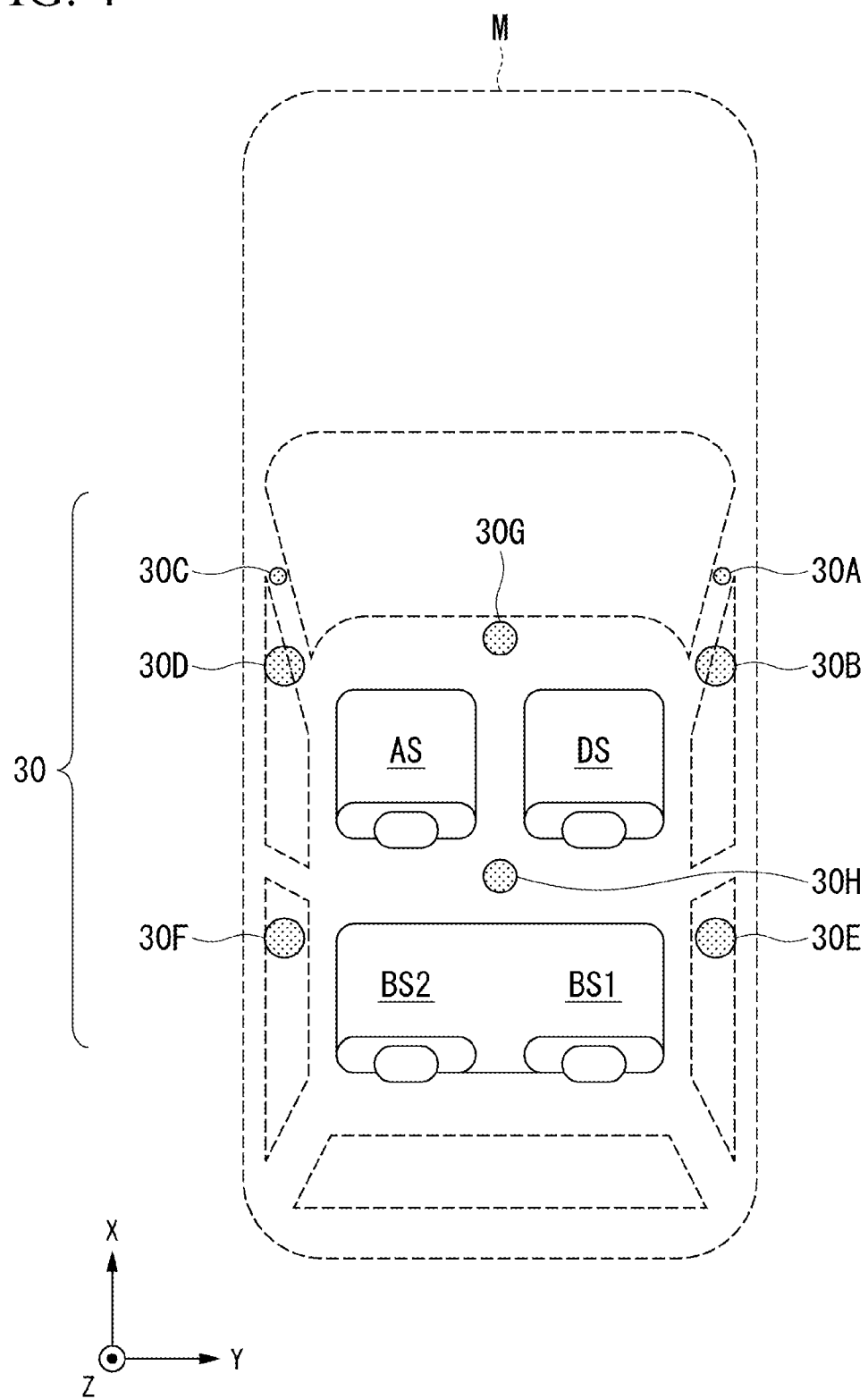
FIG. 4 is a diagram showing an example of disposition of the speaker.

FIG. 4 is a diagram showing an example of disposition of the speaker 30. The speaker 30 includes, for example, speakers 30A to 30F. The speaker 30A is provided in a window pillar (so-called A pillar) on the driver seat DS side. The speaker 30B is provided in a lower portion of a door close to the driver seat DS. The speaker 30C is provided in a window pillar on the passenger seat AS side. The speaker 30D is provided in a lower portion of a door close to the passenger seat AS. The speaker 30E is provided near the second display 24. The speaker 30F is provided on a ceiling (roof) of the vehicle cabin. The speaker 30 may be provided in a lower portion of a door close to a right back seat or a left back seat.

In the disposition, for example, in a case where sound is output from only the speakers 30A and 30B, a sound image is localized near the driver seat DS. The phrase "a sound image is localized" indicates that, for example, spatial positions of sound sources felt by an occupant are defined by adjusting the magnitudes of sound transferred to the right and left ears of the occupant. In a case where sound is output from only the speakers 30C and 30D, a sound image is localized near the passenger seat AS. In a case where sound is output from only the speaker 30E, a sound image is localized near a front side of the vehicle cabin, and, in a case where sound is output from only the speaker 30F, a sound image is localized near an upper side of the vehicle cabin. This is only an example, and the speaker 30 may localize a sound image at any position in the vehicle cabin by adjusting allocation of sound output from the respective speakers by using a mixer or an amplifier.

Agent Apparatus

Referring to FIG. 2 again, the agent apparatus 100 includes a manager 110, agent function portions 150-1, 150-2, and 150-3, and a pairing application executor 152.

The manager 110 includes, for example, a sound processor 112, an agent wakeup (WU) determiner 114, a display controller 116, a voice controller 118, a voice recognizer 120, a natural language processor 122, a history information generator 124, and a selector 126. In a case where the agent function portions are not differentiated from each other, the agent function portions will be simply referred to as agent function portions 150. The three agent function portions 150 being shown is only an example corresponding to the number of agent servers 200 in FIG. 1, and the number of agent function portions 150 may be two or four or more. The software disposition shown in FIG. 2 is simply shown for description, and, actually, any modification may occur such that, for example, the manager 110 is interposed between the agent function portions 150 and the on-vehicle communication apparatus 60.

Each constituent element of the agent apparatus 100 is realized, for example, by a hardware processor such as a central processing unit (CPU) executing a program (software). Some or all of the constituent elements may be realized by hardware (a circuit; including a circuitry) such as a large scale integration (LSI), an application specific integrated circuit (ASIC), a field-programmable gate array (FPGA), or a graphics processing unit (GPU), and may be realized in cooperation between software and hardware. The program may be stored in advance in a storage device (a storage device provided with a non-transitory storage medium) such as a hard disk drive (HDD) or a flash memory, and may be stored in an attachable and detachable storage medium (non-transitory storage medium) such as a DVD or a CD-ROM and may be installed when the storage medium is attached to a drive device.

The agent apparatus 100 includes a storage 160. The storage 160 is realized by the various storage devices. The storage 160 stores data such as a dictionary database (DB) 162 and history information 164, and programs. Details of the dictionary DB 162 and the history information 164 will be described later.

The manager 110 performs a function as a result of executing a program such as an operating system (OS) or middleware.

The sound processor 112 of the manager 110 receives collected sound from the microphones 10, and performs sound processing on the received sound such that the sound is brought into a state appropriate for being recognized by the natural language processor 122. The sound processing is, for example, noise removal through filtering using a bandpass filter, or sound amplification.

The agent WU determiner 114 is provided to correspond to each of the agent function portions 150-1, 150-2, and 150-3, and recognizes wakeup words predefined for each agent. The agent WU determiner 114 recognizes semantics of speech on the basis of the speech (voice stream) subjected to the sound processing. First, the agent WU determiner 114 detects a speech duration on the basis of the amplitude of a voice waveform and zero crossing in the voice stream. The agent WU determiner 114 may perform duration detection on the basis of voice identification and non-voice identification in the frame unit based on a Gaussian mixture model (GMM).

Next, the agent WU determiner 114 generates speech in the detected speech duration as text, and handles the text as text information. The agent WU determiner 114 determines whether or not the text information regarding the text corresponds to wakeup words (phrase). In a case where it is determined that the text information corresponds to wakeup words, the agent WU determiner 114 notifies the selector of information indicating the corresponding agent function portion 150. The function corresponding to the agent WU determiner 114 may be installed in the agent server 200. In this case, the manager 110 transmits a voice stream subjected to sound processing in the voice recognizer 120 to the agent server 200, and, in a case where the agent server 200 determines that the voice stream corresponds to wakeup words, the agent function portion 150 starts in response to an instruction from the agent server 200. Each agent function portion 150 may start at any time and may automatically determine wakeup words. In this case, the manager 110 is not required to include the agent WU determiner 114.

The display controller 116 displays an image in at least a part of the display in response to an instruction from the selector 126 or the agent function portion 150. Hereinafter, a description will be made assuming that an image regarding an agent is displayed on the first display 22. The display controller 116 generates, for example, an image (hereinafter, referred to as an agent image) of a personified agent that performs communication with an occupant in the vehicle cabin under the control of the selector 126 or the agent function portion 150, and displays the generated agent image on the first display 22. The agent image is, for example, an image in an aspect of talking to the occupant. The agent image may include at least, for example, a face image in which an expression or a face orientation is recognized by an observer (occupant). For example, in the agent image, parts simulating eyes or a nose may be displayed in a face region, and an expression or a face orientation may be recognized on the basis of positions of the parts in the face region. The agent image may include a head image perceived stereoscopically in a three-dimensional space such that a face orientation of an agent is recognized by an observer, or may include an image of a body (a trunk or hands and feet) such that an action, a behavior, or a pose of the agent is recognized. The agent image may be an animation image. For example, the display controller 116 may display the agent image in a display region close to a position of an occupant recognized by the occupant recognition apparatus 80, or may generate and display the agent image in which a face is directed toward the position of the occupant.

The voice controller 118 outputs speech from some or all of the speakers included in the speaker 30 in response to an instruction from the selector 126 or the agent function portion 150. The voice controller 118 may perform control of localizing a sound image of an agent voice at a position corresponding to a display position of the agent image by using a plurality of speakers 30. The position corresponding to the display position of the agent image is, for example, a position where an occupant is predicted to feel that the agent image issues an agent voice, and is, specifically, a position (for example, within 2 to 3 cm) near the display position of the agent image.

The voice recognizer 120 recognizes semantics of the speech on the basis of the speech (voice stream) subjected to sound processing. First, the voice recognizer 120 detects a speech duration on the basis of the amplitude of a voice waveform and zero crossing in the voice stream. The voice recognizer 120 may perform duration detection on the basis of voice identification and non-voice identification in the frame unit based on a Gaussian mixture model (GMM). Next, the voice recognizer 120 generates speech in the detected speech duration as text, and outputs text information regarding the text to the natural language processor 122.

The natural language processor 122 performs semantic interpretation on the text information that is input from the voice recognizer 120 while referring to the dictionary DB 162. The dictionary DB 162 is a DB in which abstracted semantic information is correlated with text information. The dictionary DB 162 may include list information of synonyms or similar words. The process in the voice recognizer 120 and the process in the natural language processor 122 are not clearly differentiated from each other in stages, and may influence each other, for example, by the voice recognizer 120 receiving a process result from the natural language processor 122 and correcting a recognition result.

For example, in a case where semantics (request) such as "Today's weather" or "What is the weather like?" is recognized as a recognition result, the natural language processor 122 generates a command replaced with standard text information "Today's weather". The command is, for example, a command for executing the function of each of the agent function portions 150-1 to 150-3. Consequently, even in a case where there is variation in the wording of speech of a request, it is possible to facilitate a dialogue in accordance with the request. The natural language processor 122 may recognize semantics of text information or may generate a command based on a recognition result by using an artificial intelligence process such as a machine learning process using a probability. In a case where formats or parameters of commands for executing the functions of the respective agent function portions 150 are different from each other, the natural language processor 122 may generate a recognizable command for each agent function portion 150.

The natural language processor 122 outputs the generated commands to the agent function portions 150-1 to 150-3. The voice recognizer 120 may output not only the voice commands but also a voice stream to an agent function portion to which the voice stream is required to be input among the agent function portions 150-1 to 150-3.

The history information generator 124 generates the history information 164 on the basis of information related to a process before the agent function portion 150 transmits a command to the agent server 200 and then acquires a response result from the agent server 200. Details of the process in the history information generator 124 will be described later.

The selector 126 selects the agent function portion 150 for which wakeup words are recognized by the agent WU determiner 114 as the agent function portion 150 making a response to the occupant's speech. In a case where wakeup words are not recognized by the agent WU determiner 114, the selector 126 refers to the history information 164, and selects the agent function portion 150 realizing a function (that is, corresponding to the occupant's speech) identified by the natural language processor 122. Details of the process in which the selector 126 selects the agent function portion 150 will be described later. The selector 126 transmits a voice stream to the selected agent function portion 150, and thus the agent function portion 150 starts.

The agent function portion 150 causes an agent to appear in cooperation with the corresponding agent server 200, and provides a service including outputting a voice response from the output in response to the occupant's speech in the vehicle. The agent function portions 150 may include an agent function portion having the right to control the vehicle equipment 50. The agent function portion 150 may include an agent function portion that performs communication with the agent server 200 via the pairing application executor 152 in collaboration with the general-purpose communication apparatus 70. For example, the agent function portion 150-1 may have the right to control the vehicle equipment 50. The agent function portion 150-1 performs communication with the agent server 200-1 via the on-vehicle communication apparatus 60. The agent function portion 150-2 performs communication with the agent server 200-2 via the on-vehicle communication apparatus 60. The agent function portion 150-3 performs communication with the agent server 200-3 via the pairing application executor 152 in collaboration with the general-purpose communication apparatus 70.

The pairing application executor 152 performs pairing with the general-purpose communication apparatus 70 via, for example, Bluetooth (registered trademark), and thus connects the agent function portion 150-3 to the general-purpose communication apparatus 70. The agent function portion 150-3 may be connected to the general-purpose communication apparatus 70 through wired communication using a Universal Serial Bus (USB). Hereinafter, in some cases, an agent that appears in cooperation between the agent function portion 150-1 and the agent server 200-1 will be referred to as an agent 1, an agent that appears in cooperation between the agent function portion 150-2 and the agent server 200-2 will be referred to as an agent 2, and an agent that appears in cooperation between the agent function portion 150-3 and the agent server 200-3 will be referred to as an agent 3. Each of the agent function portions 150-1 to 150-3 executes a process based on a voice command that is input from the manager 110, and outputs an execution result to the manager 110.

Agent Server

Figure 5:
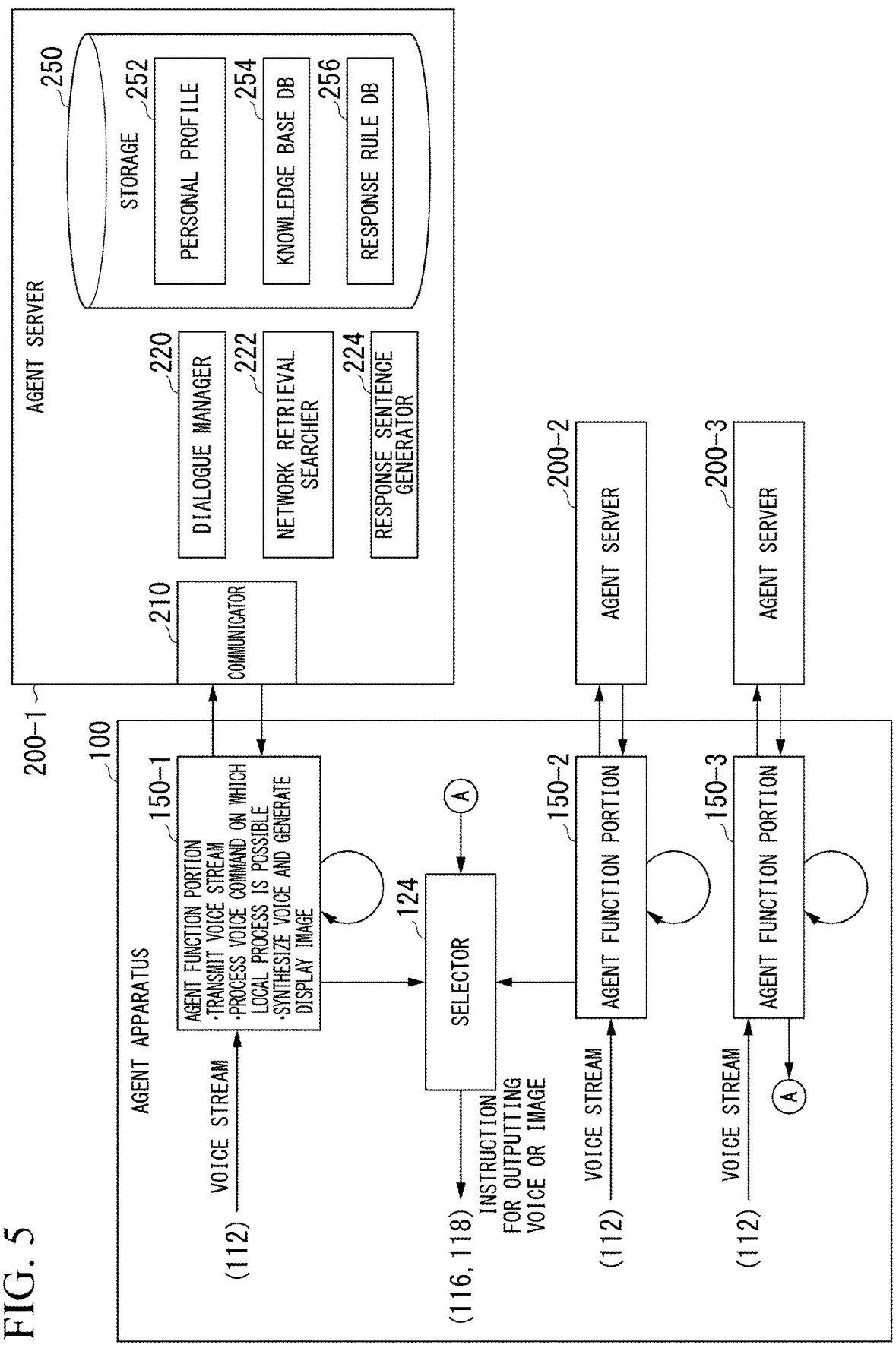
FIG. 5 is a diagram showing a configuration of an agent server and a part of a configuration of the agent apparatus.

FIG. 5 is a diagram showing a configuration of the agent server 200 and a part of the configuration of the agent apparatus 100. Hereinafter, a description will be made of an operation of the agent function portion 150 or the like along with the configuration of the agent server 200. Herein, a description of physical communication from the agent apparatus 100 to the network NW will be omitted. Hereinafter, the description will focus on the agent function portion 150-1 and the agent server 200-1, but sets of the other agent function portions and agent servers perform substantially identical operations although detailed functions thereof may differ.

The agent server 200-1 includes a communicator 210. The communicator 210 is a network interface such as a network interface card (NIC). The agent server 200-1 further includes, for example, a dialogue manager 220, a network retrieval searcher 222, and a response sentence generator 224. The constituent elements are realized, for example, by a hardware processor such as a CPU executing a program (software). Some or all of the constituent elements may be realized by hardware (a circuit; including a circuitry) such as an LSI, an ASIC, an FPGA, or a GPU, and may be realized in cooperation between software and hardware. The program may be stored in advance in a storage device (a storage device provided with a non-transitory storage medium) such as an HDD or a flash memory, and may be stored in an attachable and detachable storage medium (non-transitory storage medium) such as a DVD or a CD-ROM to be installed when the storage medium is attached to a drive device.

The agent server 200-1 includes a storage 250. The storage 250 is realized by the various storage devices. The storage 250 stores data such as a personal profile 252, a knowledge base DB 254, and a response rule DB 256, and programs.

In the agent apparatus 100, the agent function portion 150-1 transmits a command (or a command subjected to a process such as compression or coding) to the agent server 200-1. In a case where a command on which a local process (a process without using the agent server 200-1) is possible is recognized, the agent function portion 150-1 may execute a process requested by the command. The command on which the local process is possible is, for example, a command to which an answer can be given by referring to the storage 160 of the agent apparatus 100. More specifically, the command on which the local process is possible is, for example, a command for retrieving a name of a specific person from a telephone directory and making a telephone call (calling the other party) to a telephone number correlated with the coincident name. Therefore, the agent function portion 150-1 may have some of the functions of the agent server 200-1.

The dialogue manager 220 determines a response content (for example, a speech content or an image output to the occupant) for the occupant of the vehicle M while referring to the personal profile 252, the knowledge base DB 254, or the response rule DB 256 on the basis of an input command. The personal profile 252 includes personal information, preferences, a history of past dialogues, and the like of an occupant, stored for each occupant. The knowledge base DB 254 is information defining a relationship between objects. The response rule DB 256 is information defining an operation (for example, an answer or an equipment control content) to be performed by an agent in response to a command.

The dialogue manager 220 may use feature information obtained from a voice stream and collate the feature information with the personal profile 252 so as to identify the occupant. In this case, in the personal profile 252, for example, voice feature information is correlated with personal information. The voice feature information is, for example, information regarding features of a manner of talking such as a voice pitch, an intonation, and a rhythm (a pattern of rise and fall of a voice), or a feature index based on Mel Frequency Cepstrum Coefficients. The voice feature information is information obtained, for example, by causing the occupant to say a predetermined word or sentence during initial registration of the occupant and recognizing the issued speech.

In a case where a command is a request for information that can be retrieved via the network NW, the dialogue manager 220 causes the network retrieval searcher 222 to perform retrieval. The network retrieval searcher 222 accesses the various web servers 300 via the network NW, and acquires desired information. The "information that can be retrieved via the network NW" is, for example, general users' evaluation results of a restaurant around the vehicle M or that day's weather report corresponding to a position of the vehicle M.

The response sentence generator 224 generates a response sentence such that a speech content determined by the dialogue manager 220 is delivered to the occupant of the vehicle M, and transmits the response sentence to the agent apparatus 100. The response sentence generator 224 may acquire a result recognized by the occupant recognition apparatus 80 from the agent apparatus 100, and may generate a response sentence of calling the occupant by name or of mimicking the occupant's manner of speaking in a case where the occupant having delivered the speech including the command is identified as an occupant registered in the personal profile 252 on the basis of the acquired recognized result.

When the response sentence is acquired, the agent function portion 150 instructs the voice controller 118 to synthesize a voice and to output the voice. The agent function portion 150 instructs the display controller 116 to display an agent image in accordance with the voice output. In the above-described way, the agent function in which an agent virtually appearing responds to the occupant of the vehicle M is realized.

Process in History Information Generator 124

Hereinafter, a description will be made of details of the process in which the history information generator 124 generates the history information 164. FIG. 6 is a diagram showing examples of contents of the history information 164. The history information 164 includes, for example, a record R in which a service (that is, an executable function) that can be provided by an agent and information indicating a quality of the service are correlated with each agent that is a service providing source. The service quality includes, for example, a length of time (hereinafter, response time) after a command is transmitted to the agent server 200 until an answer is obtained, an information amount of an answer obtained from the agent server 200 with respect to an occupant's question, and a certainty factor of the answer. The certainty factor is, for example, the degree (index value) to which a result of a response to a command is estimated to be a correct answer. The certainty factor is the degree to which a response to the occupant's speech is estimated to be coincident with the occupant's request or is estimated to be an answer expected by the occupant. The information indicating the service quality is only an example and is not limited thereto, and may include information other than that described above.

Hereinafter, as an example, description will be made of a case where a service quality in the history information 164 is indicated by three-stage evaluation indexes. In this example, the response time is indicated by any of "short", "normal", and "long", the information amount is indicated by any of "large", "normal", and "small", and the certainty factor is indicated by any of "high", "normal", and "low". The service quality may be indicated by two-stage evaluation indexes, may be indicated by four-or-more-stage evaluation indexes, and may be indicated by a single value.

In the history information 164 shown in FIG. 6, each of the agents 1 to 3 can execute a "map retrieval function", a "weather report function", and an "information retrieval function". In the history information 164 shown in FIG. 6, the functions that can be executed by the agent 1 are all correlated with information indicating that the response time is "short", information indicating that the information amount is "large", and information indicating that the certainty factor is "high". The functions that can be executed by the agent 2 are all correlated with information indicating that the response time is "normal", information indicating that the information amount is "normal", and information indicating that the certainty factor is "normal". The "weather report function" of the agent 2 has never been used, and thus no information indicating a service quality is correlated with the "weather report function" of the agent 2. The functions that can be executed by the agent 3 are all correlated with information indicating that the response time is "long", information indicating that the information amount is "small", and information indicating that the certainty factor is "low". The "information retrieval function" of the agent 3 has never been used, and thus no information indicating a service quality is correlated with the "information retrieval function" of the agent 3.

First, when the history information 164 is generated, the respective agent function portions 150-1 to 150-3 output commands related to a service recognized by the natural language processor 122 to the agent servers 200-1 to 200-3, and the history information generator 124 measures response times after the commands are output until response results A to C are acquired from the agent servers 200-1 to 200-3. The history information generator 124 classifies the measured response times as any of "short", "normal", and "long" on the basis of a predetermined threshold value related to the response times, and correlates the classified information with each service provided due to the command in the history information 164.

The history information generator 124 may measure respective response times for the agent function portions 150-1 to 150-3 at the same timing or different timings. In a case of measuring response times with respect to the same command, the history information generator 124 measures response times when the natural language processor 122 generates a command on the basis of the occupant's speech, and simultaneously outputs the generated command to all of the agent function portions 150-1 to 150-3. In this case, since the command output timings match each other, start timings of measuring the respective response times can be unified, and thus the history information generator 124 can reduce a processing load related to the measurement. In a case of measuring response times with respect to different commands, the history information generator 124 measures a response time when the natural language processor 122 generates a command on the basis of the occupant's speech, and outputs the generated command to any (for example, the agent function portion 150 corresponding to an agent designated by wakeup words) of the agent function portions 150-1 to 150-3. In this case, a result of a response to a certain command can be uniquely obtained, and thus the selector 126 may omit a process of selecting a response result to be provided to the occupant from among a plurality of response results or a process of integrating the plurality of response results with each other.

Figure 7:
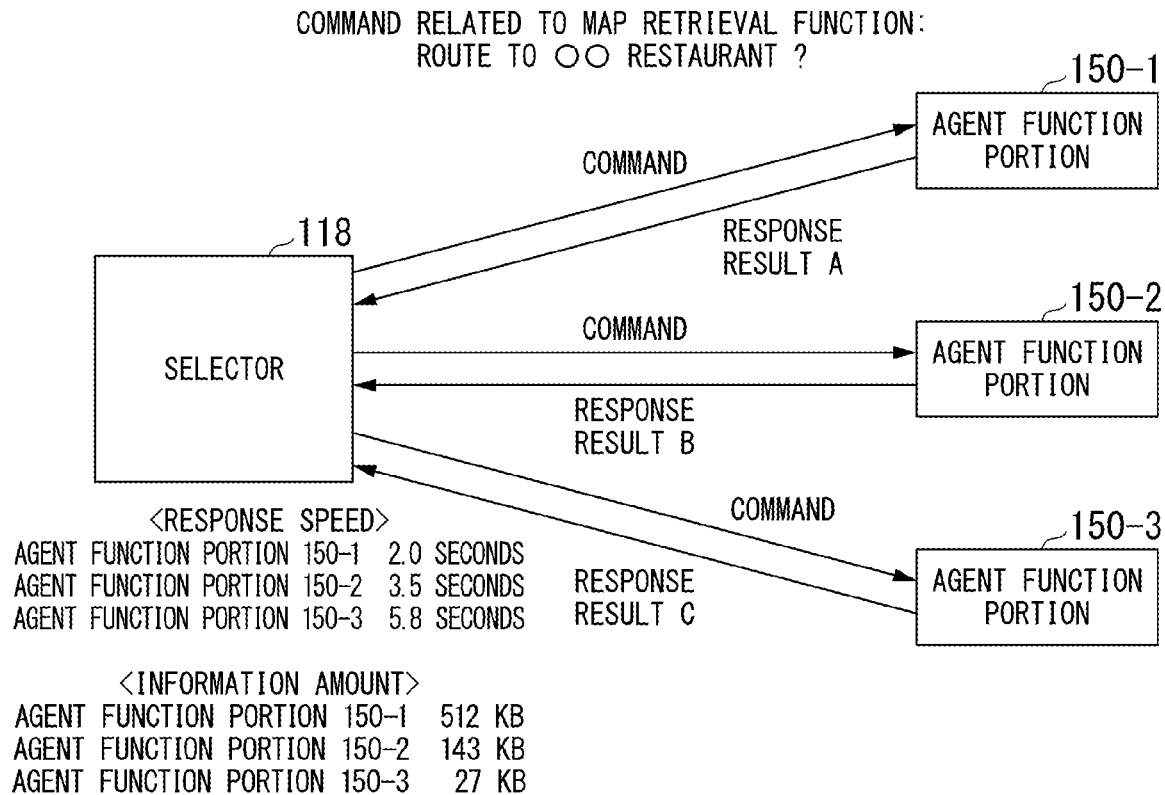
FIG. 7 is a conceptual diagram showing a process in which a history information generator acquires a response time and an evaluation index for an information amount.

FIG. 7 is a conceptual diagram showing a process in which the history information generator 124 acquires a response time and an evaluation index for an information amount. In the example shown in FIG. 7, it is assumed that, when the agent function portions 150-1 to 150-3 output the response results A to C to a command related to the "map retrieval function" to the manager 110, respective response times are 2.0 seconds, 3.5 seconds, and 5.8 seconds. In a case where a response time less than 2.5 seconds is classified as "short", a response time equal to or more than 2.5 seconds and less than 5 seconds is classified as "normal", and a response time equal to or more than 5 seconds is classified as "long" on the basis of a predetermined threshold value related to the response time, the history information generator 124 classifies the response time of the response result A as "short", classifies the response time of the response result B as "normal", and classifies the response time of the response result C as "long", and correlates the respective classified response times with the corresponding functions in the history information 164.

The history information generator 124 acquires respective information amounts of the response results A to C acquired from the agent servers 200-1 to 200-3. The history information generator 124 classifies each acquired information amount as any of "large", "normal", and "small" on the basis of a predetermined threshold value related to the information amount, and correlates the classified information with the service provided by the command in the history information 164.

In the example shown in FIG. 7, for example, in a case where a command such as "a route to the OO restaurant?" is received from the occupant, the dialogue manager 220 of each of the agent servers 200-1 to 200-3 causes the network retrieval searcher 222 to acquire information regarding a route to the "OO restaurant" as information corresponding to the command from the various web servers 300. It is assumed that respective information amounts of the response results A to C acquired from the agent servers 200-1 to 200-3 by the agent function portions 150-1 to 150-3 are 512 KB, 143 KB, and 27 KB. In a case where an information amount equal to or more than 500 KB is classified as "large", an information amount less than 500 KB and equal to or more than 100 KB is classified as "normal", and an information amount less than 100 KB is classified as "small" on the basis of a predetermined threshold value related to the information amount, the history information generator 124 classifies the information amount of the response result A as "large", classifies the information amount of the response result B as "normal", and classifies the information amount of the response result C as "small", and correlates the respective classified information amounts with the corresponding functions in the history information 164.

Each of the predetermined threshold value related to a response time and the predetermined threshold value related to an information amount may differ depending on the type of service. Here, an information amount of a response result may differ depending on the type of service, and a response time may differ depending on an information amount. The history information generator 124 sets each of the predetermined threshold value related to a response time and the predetermined threshold value related to an information amount to be relatively great with respect to a function of which an information amount is large and thus a response time is long. The history information generator 124 sets each of the predetermined threshold value related to a response time and the predetermined threshold value related to an information amount to be relatively small with respect to a function of which an information amount is small and thus a response time is short.

Figure 8:
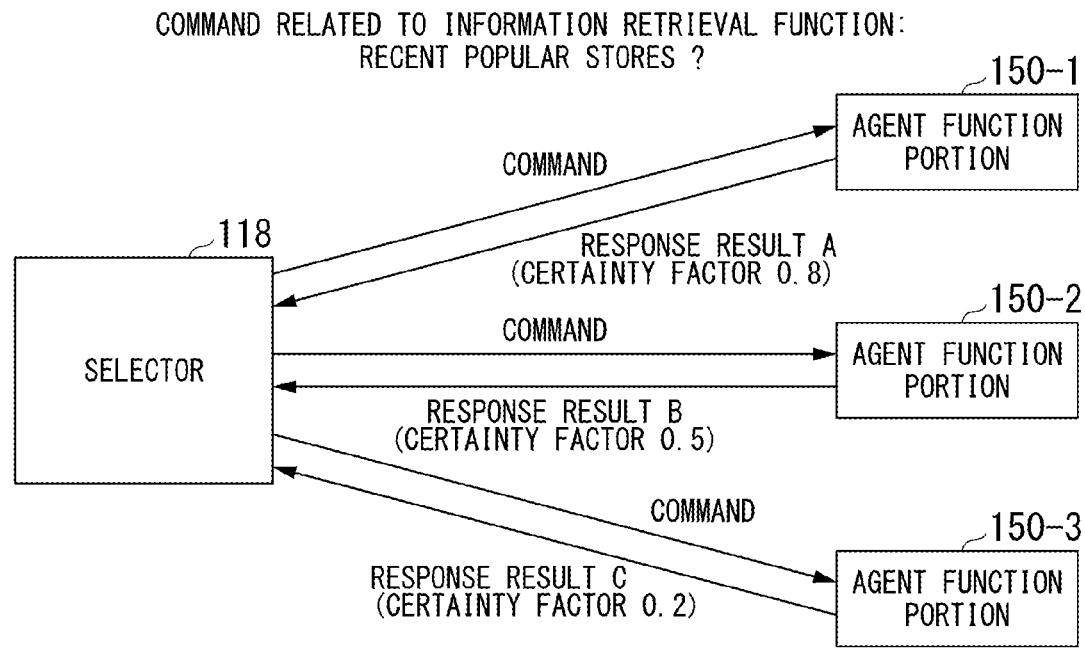
FIG. 8 is a conceptual diagram showing a process in which the history information generator acquires an evaluation index for a certainty factor.

FIG. 8 is a conceptual diagram showing a process in which the history information generator 124 acquires an evaluation index for a certainty factor. Each of the plurality of agent function portions 150-1 to 150-3 determines, for example, a response content on the basis of the personal profile 252, the knowledge base DB 254, or the response rule DB 256 stored in the storage 250, and also determines a certainty factor of the response content.

For example, in a case where a command such as "recent popular stores?" is received from the occupant, it is assumed that the dialogue manager 220 causes the network retrieval searcher 222 to acquire information such as a "clothing store", a "shoe store", and an "Italian restaurant venue" as information corresponding to the command from the various web servers 300. Here, the dialogue manager 220 refers to the personal profile 252, and sets, to be high, a certainty factor of a response result of which the degree of coincidence with the occupant's hobby is high. For example, in a case where the occupant's hobby is "dining", the dialogue manager 220 sets a certainty factor of the "Italian restaurant venue" to be higher than that of other information. The dialogue manager 220 may set a certainty factor to become higher as general users' evaluation results (the degree of recommendation) of each store acquired from the various web servers 300 become more favorable.

The dialogue manager 220 may determine a certainty factor on the basis of the number of response candidates obtained as a retrieval result corresponding to a command. For example, in a case where the number of response candidates is one, the dialogue manager 220 sets a certainty factor to be highest since there are no other candidates. As the number of response candidates becomes larger, the dialogue manager 220 sets a certainty factor of each thereof to become lower.

The dialogue manager 220 may determine a certainty factor on the basis of the adequacy of a response content obtained as a retrieval result corresponding to a command. For example, in a case where not only text information but also image information can be acquired as a retrieval result, the dialogue manager 220 sets a certainty factor to be high since the adequacy is higher than in a case where an image is not acquired.

The dialogue manager 220 may use a command and information regarding a response content, and may set a certainty factor on the basis of a relationship between both thereof by referring to the knowledge base DB 254. The dialogue manager 220 may refer to the personal profile 252 to check whether or not there are similar questions in a recent (for example, within one month) dialogue history, and, in a case where there are similar questions, may set a certainty factor of a response content similar to answers thereto to be high. The dialogue history may be a history of conversations with an occupant having delivered speech, and may be a history of conversations with persons other than the occupant, included in the personal profile 252. The dialogue manager 220 may set a certainty factor by combining the plurality of certainty factor setting conditions with each other.

The dialogue manager 220 may normalize a certainty factor. For example, the dialogue manager 220 may perform normalization such that a certainty factor is in a range of 0 to 1 for each of the setting conditions. Consequently, even in a case where certainty factors that are set according to the plurality of setting conditions are compared with each other, the certainty factors are uniformly quantified, and thus only a certainty factor set according to any of the setting conditions is not high. As a result, a more appropriate response result can be selected on the basis of the certainty factors.

In the example shown in FIG. 8, it is assumed that a certainty factor of the response result A determined by the agent function portion 150-1 is 0.8, a certainty factor of the response result B determined by the agent function portion 150-2 is 0.5, and a certainty factor of the response result C determined by the agent function portion 150-3 is 0.2. In a case where a certainty factor equal to or more than 0.8 is classified as "high", a certainty factor less than 0.8 and equal to or more than 0.5 is classified as "normal", and a certainty factor less than 0.5 is classified as "low" on the basis of a predetermined threshold value related to the certainty factor, the history information generator 124 classifies the certainty factor of the response result A as "high", classifies the certainty factor of the response result B as "normal", and classifies the certainty factor of the response result C as "low", and correlates the respective classified certainty factors with the corresponding functions in the history information 164.

Through the above-described processes, the history information generator 124 acquires information regarding the service quality and generates (updates) the history information 164, for example, when the occupant speaks or a function of a corresponding agent is used.

In the above description, a description has been made of a case where the agent apparatus 100 includes the history information generator 124 and generates the history information 164, but this is only an example. The history information 164 generated in advance may be stored in the storage 160 of the agent apparatus 100. In this case, any apparatus except the agent apparatus 100 may generate the history information 164, and the agent apparatus 100 may not include the history information generator 124.

Process in Selector 126

Hereinafter, a description will be made of details of a process in which the selector 126 selects the agent function portion 150 making a response to an occupant's speech on the basis of the history information 164. By referring to the history information 164 generated prior to an occupant's speech, the selector 126 compares service qualities of the respective agent function portions 150-1 to 150-3 with each other, and selects the agent function portion 150 having a high quality as the agent function portion 150 (agent) making a response to the occupant's speech. First, the selector 126 searches the history information 164 with a function identified by the natural language processor 122 as a search key, and identifies agents that can execute the function. The selector 126 selects the agent function portion 150 providing the function with the highest service quality as the agent function portion 150 making a response to the occupant's speech from among the identified agents. For example, in a case where there are a plurality of evaluation indexes indicating a service quality, the selector 126 may select the agent function portion 150 by integrating all of the evaluation indexes, and may select the agent function portion 150 on the basis of one or more (any) evaluation indexes among the plurality of evaluation indexes.

The selector 126 converts, for example, evaluation indexes represented in three stages into numerical values such as "1", "2", and "3" in the order of increasing service qualities, and selects the agent function portion 150 in which a total value of the evaluation indexes is greatest as the agent function portion 150 making a response to the occupant's speech.

In the above description, the description has been made of a case where evaluation indexes represented in three stages as information indicating a service quality are included in the history information 164, but this is only an example. For example, the history information 164 may include immediate data (a response time, an information amount, a certainty factor, and the like) used to acquire a service quality acquired by the history information generator 124. In this case, the selector 126 selects the agent function portion 150 having a high service quality on the basis of the immediate data shown in the history information 164. The selector 126 selects, for example, an agent providing the highest response speed, an agent providing the largest information amount, and an agent providing the highest certainty factor as the agent function portions 150 having the highest service quality. In a case where the agent function portion 150 is selected by integrating a plurality of evaluation indexes, the selector 126 may perform data conversion such as code conversion or standardization on various pieces of immediate data (a response time, an information amount, a certainty factor, and the like) used to acquire a service quality such that the data can be evaluated on the basis of the same scale, and then may select the agent function portion 150 on the basis of a sum of values of the immediate data. For example, the selector 126 performs data conversion on each piece of immediate data such that a great value of the immediate data corresponds to a high service quality, and a small value thereof corresponds to a low service quality. The selector 126 identifies an agent in which a sum of values after the data conversion is largest, and selects the agent function portion 150 realizing the identified agent.

Operation Flow

Figure 9:
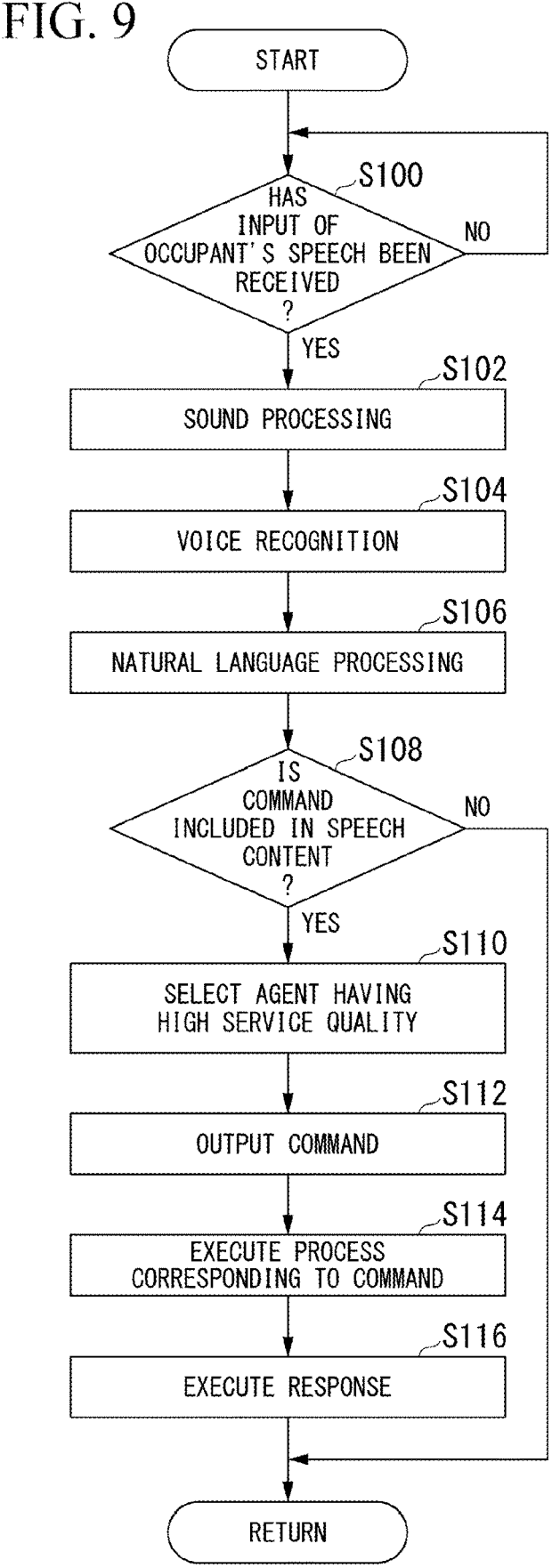
FIG. 9 is a flowchart showing a series of flows of an operation of the agent apparatus according to the first embodiment.

FIG. 9 is a flowchart showing a series of flows of an operation of the agent apparatus 100 according to the first embodiment. A process according to the flowchart is repeatedly executed, for example, at predetermined time intervals or at predetermined timings.

First, the voice recognizer 120 determines whether or not an occupant's speech has been received by the microphones 10 (step S100). In a case where it is determined that the occupant's speech has been received by the microphones 10, the voice recognizer 120 performs sound processing on speech issued by the occupant (step S102). Next, the voice recognizer 120 recognizes the speech (voice stream) subjected to the sound processing, and thus generates the speech as text (step S104). Next, the natural language processor 122 executes natural language processing on text information regarding the text, and performs semantic interpretation on the text information (step S106).

Next, the natural language processor 122 determines whether or not a command is included in a content of the occupant's speech obtained through the semantic interpretation (step S108). In a case where the command is not included in the content of the occupant's speech, the natural language processor 122 finishes the process. In a case where the natural language processor 122 determines that the command is included in the content of the occupant's speech, the selector 126 searches the history information 164 with the command (function) identified by the natural language processor 122 as a search key, and selects the agent function portion 150 realizing an agent having the highest service quality as the agent function portion 150 making a response to the occupant's speech (step S110).

The selector 126 outputs the command identified by the natural language processor 122 to the selected agent function portion 150 (step S112). The agent function portion 150 having received the command executes a process corresponding to the command (step S114). The selector 126 acquires a response result from the selected agent function portion 150, and executes a response to the occupant's speech (step S116). Consequently, the process according to the flowchart is finished.

Summary of First Embodiment

As described above, the agent apparatus 100 of the present embodiment includes a plurality of agent function portions 150 providing a service including outputting a voice response from an output in response to an occupant's speech in the vehicle M; a recognizer (the voice recognizer 120 and the natural language processor 122) recognizing a voice command included in the occupant's speech; and the selector 126 selecting the agent function portion 150 that executes the voice command recognized by the recognizer, corresponds to the occupant's speech, and has a high service quality, from among the plurality of agent function portions 150, and thus it is possible to provide a more appropriate response result.

Second Embodiment

Hereinafter, a second embodiment will be described. In the second embodiment, a description will be made of a case where there is an agent of which a service quality has already been fixed to be high. The same constituent element as in the above-described embodiment will be given the same reference numeral, and a description thereof will not be repeated.

Figure 10:
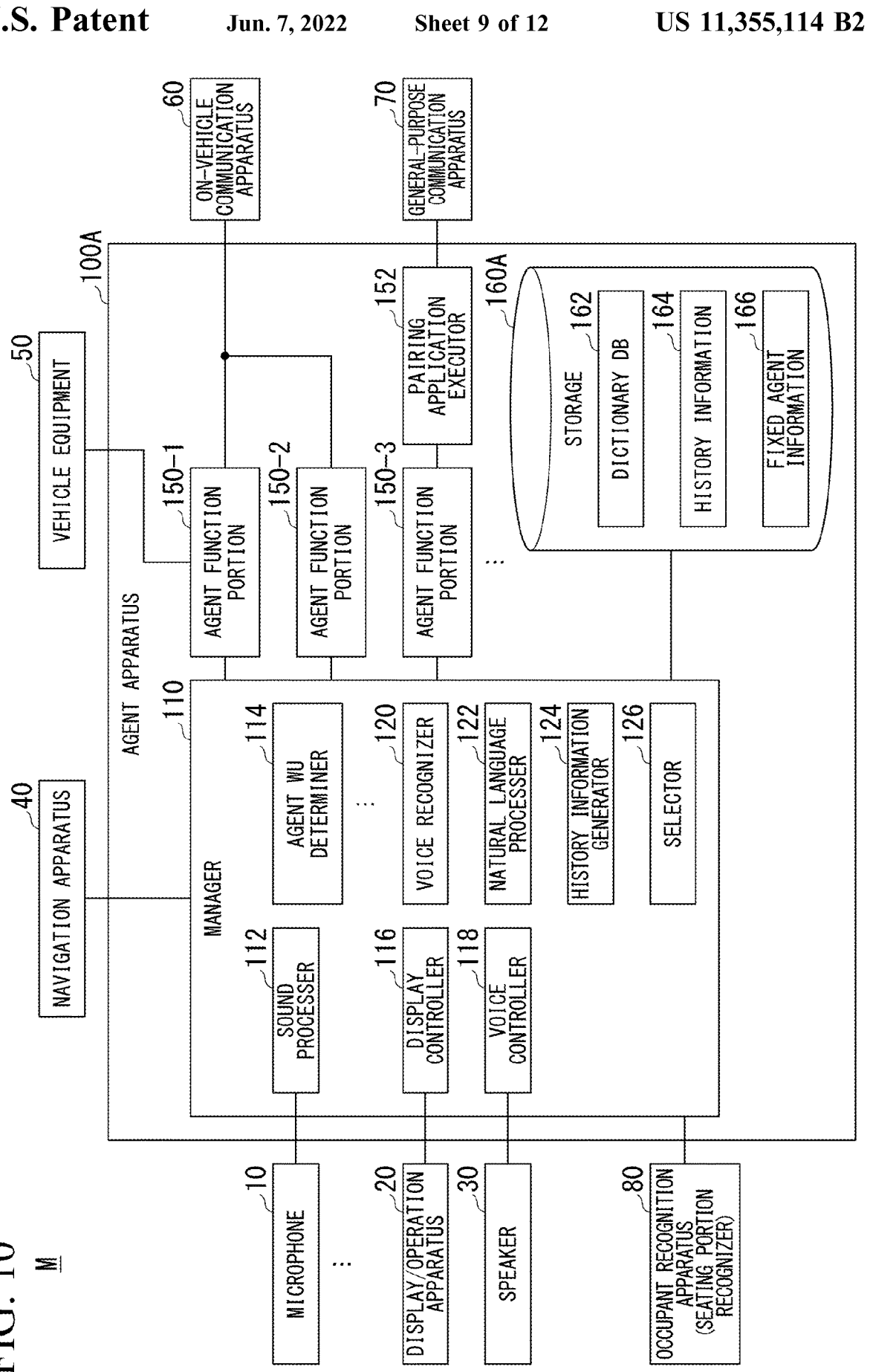
FIG. 10 is a diagram showing a configuration of an agent apparatus according to a second embodiment and equipment mounted on a vehicle.

FIG. 10 is a diagram showing a configuration of an agent apparatus 100A according to the second embodiment and equipment mounted on a vehicle M. The vehicle M is mounted with, for example, one or more microphones 10, a display/operation apparatus 20, a speaker 30, a navigation apparatus 40, vehicle equipment 50, an on-vehicle communication apparatus 60, an occupant recognition apparatus 80, and the agent apparatus 100A. A general-purpose communication apparatus 70 may be brought into a vehicle cabin to be used as a communication apparatus. The apparatuses are connected to each other via a multiplex communication line such as a CAN communication line, a serial communication line, or a wireless communication line.

The agent apparatus 100A includes a storage 160A instead of (or in addition to) the storage 160 included in the agent apparatus 100. The storage 160A stores data such as a dictionary DB 162, history information 164, and fixed agent information 166, and programs. The fixed agent information 166 is information indicating an agent of which a service quality is fixed to be high.

FIG. 11 is a diagram showing examples of contents of the fixed agent information 166. The fixed agent information 166 is information in which, for example, a service (that is, an executable function) that can be provided by an agent is correlated with the agent that can provide the function with the highest service quality. The selector 126 of the present embodiment executes, for example, a process of generating the fixed agent information 166. For example, in a case where information regarding a service quality is equal to or more than a predetermined threshold value (that is, the service quality is high) with respect to a function of a certain agent, and the function has been provided to an occupant a predetermined number of times or more, the selector 126 determines the agent as being an agent that can provide the function with the highest service quality, and generates (updates) the fixed agent information 166 by correlating the function with the agent.

The selector 126 of the present embodiment transitions from a state of dynamically selecting an agent having the highest service quality on the basis of the history information 164 to a state of fixedly selecting the agent function portion 150 realizing an agent having the highest service quality on the basis of the fixed agent information 166. First, the fixed agent information 166 is searched with a function identified by the natural language processor 122 as a search key, and thus it is determined whether or not the function is included in the fixed agent information 166. In a case where the function is included in the fixed agent information 166, the selector 126 identifies an agent correlated with the function as an agent having the highest service quality. The selector 126 fixedly selects the agent function portion 150 realizing the identified agent as the agent function portion 150 making a response to an occupant's speech. A process after the agent function portion 150 is selected by the selector 126 and a process in a case where the function identified by the natural language processor 122 is not included in the fixed agent information 166 are the same as those in the above-described embodiment, and thus a description thereof will not be repeated.

The selector 126 may perform a process of fixing an agent having the highest service quality in a case where a determination target function is used by all agents. For example, in the history information 164 shown in FIG. 6, the "weather report function" of the agent 2 is not correlated with information indicating a service quality, and thus the selector 126 does not perform a process of fixing an agent that can provide the "weather report function" with the highest service quality. Consequently, in a case where an agent of which a function is not used yet is an agent that can provide the function with the highest service quality, the selector 126 can prevent another agent from being fixed as an agent that can provide the function with the highest service quality.

Here, in a case where a certain function is included in the fixed agent information 166, and then the function is provided to an occupant for the first time, the agent function portion 150 may notify the occupant that an agent that can provide the certain function with the highest service quality is fixed and is fixedly selected, between the occupant's speech and provision of a service. FIG. 12 is a diagram showing an example of a dialogue to introduce a fixed agent between an occupant's speech and provision of a service. First, an occupant makes a speech CV1 including a request for providing a map retrieval function to an agent. The speech CV1 is, for example, words such as "a route to the OO restaurant?". Accordingly, the selector 126 searches, for example, the fixed agent information 166 with a function (in this example, the map retrieval function) identified by the natural language processor 122 through the above-described process as a search key. In the fixed agent information 166 shown in FIG. 11, the agent 1 is fixed as an agent that can provide the "map retrieval function" with the highest service quality. Thus, the selector 126 fixedly selects the agent function portion 150-1 as the agent function portion 150 making a response to the occupant's speech.

The agent function portion 150 (in this example, the agent function portion 150-1) fixedly selected by the selector 126 acquires a response result RP1 to the speech CV1 from the corresponding agent server 200 (in this example, the agent server 200-1), and instructs the voice controller 118 to synthesize the response result RP1 into speech such that the speech is output.

The response result RP1 includes, for example, words to introduce an agent of the agent function portion 150 realizing the requested function in the speech CV1. The response result RP1 includes, for example, words to notify the occupant that an agent having the highest service quality is fixed. The response result RP1 includes words related to provision of a service (that is, words indicating an answer to the occupant's speech) after the agent having the highest service quality is delivered. The response result RP1 includes, for example, words that "Hello. I am ΔΔ (agent 1). From now on, I will provide the map retrieval function. It takes you . . . to the OO restaurant."

The response result may deliver an agent having the highest service quality after words related to provision of a service. FIG. 13 is a diagram showing an example of a dialogue to introduce a fixed agent after a service is provided. The response result RP2 includes, for example, words to introduce the agent of the agent function portion 150 realizing the requested function in the speech CV1. The response result RP2 includes words related to provision of the service. The response result RP2 includes, for example, words to notify the occupant that an agent having the highest service quality is fixed after the service is provided. In this case, the response result RP2 includes, for example, words that "Hello. I am ΔΔ (agent 1). It takes you . . . to the OO restaurant. From now on, I will provide the map retrieval function."

The agent function portion 150 gives an answer along with the response result RP1 in FIG. 12 or the response result RP2 in FIG. 13, and can thus naturally notify the occupant of the agent having the highest service quality. In a case where an agent having the highest service quality is fixed, the selector 126 can select an agent (agent function portion 150) as long as a request for a service is received in an occupant's speech, and thus wakeup words can be omitted at the time of the request for the service.

The agent function portion 150 may control an aspect of a notification such that information related to an agent having the highest service quality is located before words related to provision of a service, and is sent as in the response result RP1 in FIG. 12 in a case where there is designation from an occupant, and such that the information related to an agent having the highest service quality is located after the words related to provision of a service, and is sent as in the response result RP2 in FIG. 13 in a case where there is designation from the occupant. The agent function portion 150 may send a notification that information related to an agent having the highest service quality is located before and after words related to provision of a service.

Even when wakeup words and a command are recognized in an occupant's speech, in a case where an agent designated by the wakeup words is not an agent that can provide a service recognized by the natural language processor 122 with the highest quality by referring to the fixed agent information 166, the selector 126 may select an agent that can provide a service shown in the fixed agent information 166 with the highest quality as an agent (agent function portion 150) making a response to the occupant's speech. Even when wakeup words and a command are recognized in an occupant's speech, in a case where an agent designated by the wakeup words is not an agent that can provide a service recognized by the natural language processor 122 with the highest quality by referring to the fixed agent information 166, the selector 126 may notify the occupant of an agent that can provide the service with the highest quality. In this case, for example, the selector 126 causes the voice controller 118 to output speech for introducing an agent that can provide the service with the highest quality. In the process of introducing an agent, the voice controller 118 is an example of a "notification controller". The display controller 116 may display an image for introducing an agent on each of the first display 22, the second display 24, the meter display 29, and the like. In this case, the display controller 116 is an example of a "notification controller".

Operation Flow

Figure 14:
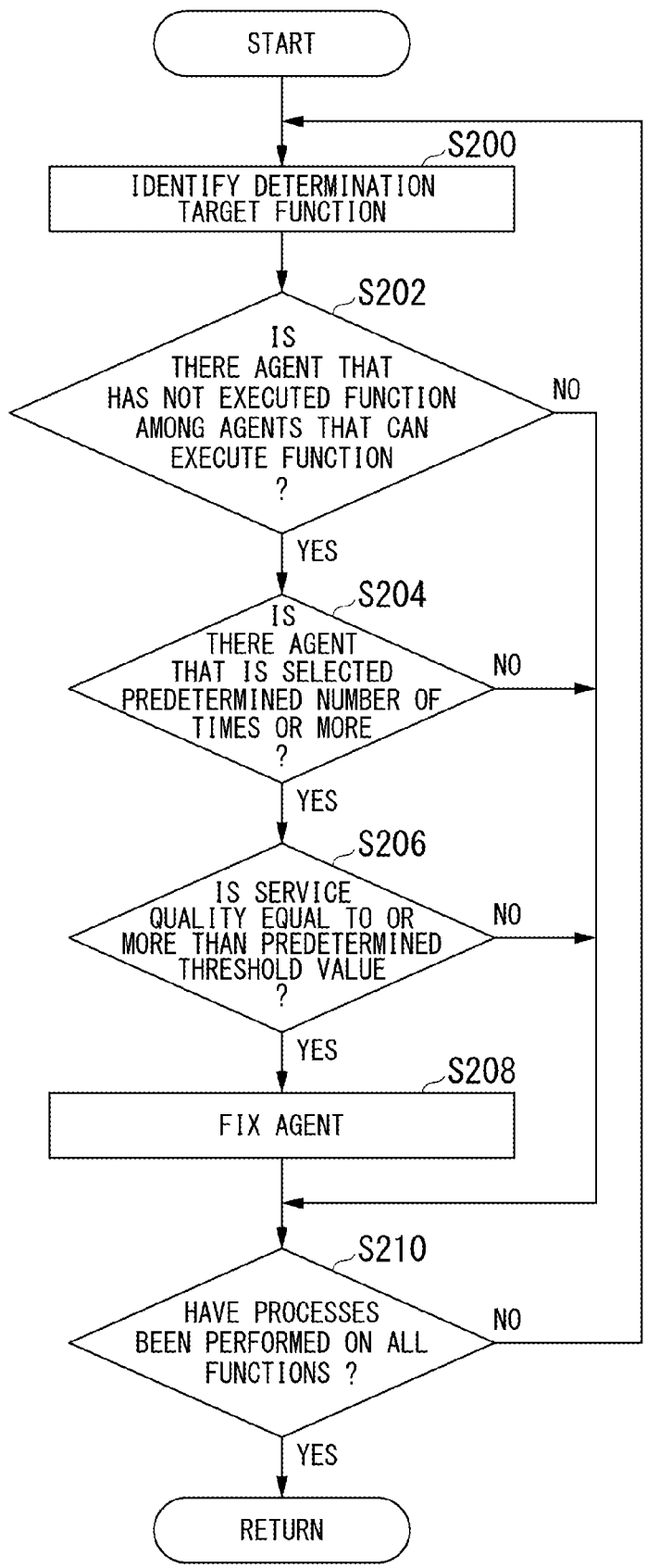
FIG. 14 is a flowchart showing a series of flows of a process in which a selector generates fixed agent information.

FIG. 14 is a flowchart showing a series of flows of a process in which the selector 126 generates the fixed agent information 166. The process according to the flowchart is repeatedly executed, for example, at predetermined time intervals or at predetermined timings.

First, the selector 126 identifies a determination target function for determining whether or not an agent is an agent having the highest service quality among functions shown in the history information 164 (step S200). The selector 126 determines whether or not there is an agent that has not executed the function among agents that can realize the identified function on the basis of the history information 164 (step S202). In a case where there is an agent that has not executed the function, the selector 126 determines that the current stage is not a stage of fixing an agent having the highest service quality, and thus causes the process to proceed to step S210. When provision of the function is requested by an occupant's speech, the selector 126 determines whether or not there is an agent selected a predetermined number of times or more as an agent having the highest service quality from among agents realizing the identified function (step S204). In a case where there is no agent selected a predetermined number of times or more, the selector 126 determines that the current stage is not a stage of fixing an agent having the highest service quality, and thus causes the process to proceed to step S210.

In a case where there is the agent selected a predetermined number of times or more, the selector 126 determines whether or not information indicating a service quality of the agent related to the function identified in step S200 is equal to or more than a predetermined threshold value (for example, a response speed, an information amount, or a certainty factor is equal to or more than a predetermined threshold value) (step S206). In a case where the information indicating the service quality is not equal to or more than the predetermined threshold value, the selector 126 does not fix the agent as an agent having the highest service quality, and causes the process to proceed to step S208.

In a case where the information indicating the service quality is equal to or more than the predetermined threshold value, the selector 126 fixes the agent as an agent having the highest service quality, and generates (updates) the fixed agent information 166 by correlating the agent with the function identified in step S200 (step S208). The selector 126 repeatedly performs the processes in steps S200 to S208 until the processes are performed on all functions shown in the history information 164 (step S210).

FIG. 15 is a flowchart showing a series of flows of an operation of the agent apparatus 100A according to the second embodiment. A process according to the flowchart is repeatedly executed, for example, at predetermined time intervals or at predetermined timings. The flowchart of FIG. 15 is different from the flowchart of FIG. 10 in the first embodiment in that processes in steps S300 to S306 are provided instead of the processes in steps S100 to S116. Therefore, hereinafter, a description will focus on the processes in steps S300 to S306.

In a case where the natural language processor 122 determines that the command is included in the content of the occupant's speech obtained through the semantic interpretation in step S108, the selector 126 determines whether or not an agent having the highest service quality and providing a function related to the command is fixed by referring to the fixed agent information 166 (step S300). In a case where the agent having the highest service quality is not fixed, the selector 126 causes the process to proceed to step S110. In a case where it is determined that the agent having the highest service quality is fixed, the selector 126 fixedly selects the fixed agent (agent function portion 150), and outputs the command identified by the natural language processor 122 to the selected agent function portion 150 (step S302). The agent function portion 150 having received the command executes a process corresponding to the command (step S304). The selector 126 acquires a response result from the selected agent function portion 150, and executes a response to the occupant's speech (step S306). Consequently, the process according to the flowchart is finished.

Summary of Second Embodiment

As described above, the agent apparatus 100A of the present embodiment includes a plurality of agent function portions 150 providing a service including outputting a voice response from an output in response to an occupant's speech in the vehicle M; a recognizer (the voice recognizer 120 and the natural language processor 122) recognizing a voice command included in the occupant's speech; and the selector 126 selecting the agent function portion 150 that executes the voice command recognized by the recognizer, corresponds to the occupant's speech, and has a high service quality, from among the plurality of agent function portions 150. The selector 126 selects an agent of which a service quality has already been fixed to be highest on the basis of the fixed agent information 166 such that it is possible to provide a more appropriate response result.

Functions of Voice Recognizer and Natural Language Processor

In the embodiments, a description has been made of a case where the voice recognizer 120 and the natural language processor 122 are provided in the agent apparatuses 100 and 100A, but this is only an example. The agent server 200 may have the functions corresponding to the voice recognizer 120 and the natural language processor 122. In this case, the agent apparatuses 100 and 100A supply a voice stream subjected to sound processing in the sound processor 112 to the agent server 200, and the agent server 200 identifies a command (function) included in an occupant's speech (that is, the voice stream) by using the functions corresponding to the voice recognizer 120 and the natural language processor 122, and supplies the identified command to the selector 126. The selector 126 executes a process on the basis of information related to the function supplied from the agent server 200.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An agent apparatus comprising:
a plurality of agent function portions each providing a service including outputting a voice response from an output in response to an occupant's speech in a vehicle;
a selector referring to history information indicating a history of a quality of a service executed by each of the plurality of agent function portions with respect to a content of the occupant's speech, and selecting an agent function portion making a response to the occupant's speech in the vehicle from among the plurality of agent function portions;
a notification controller notifying the occupant of various pieces of information by using the output; and
a fixed agent information in which the service that can be provided by the agent function portion is correlated with an agent function portion that can provide the function with a highest service quality,
wherein in a case where the function identified for the occupant's speech is included in the fixed agent information, the selector is configured to transition from a state of dynamically selecting the agent function portion that provides a service in response to a certain speech to a state of fixedly selecting the agent function portion that can provide the function with the highest service quality,
in a case where the function identified for the occupant's speech is not included in the fixed agent information, the selector is configured to select the agent function portion that responds to the occupant's speech among the plurality of agent function portions based on the history information, and wherein the notification controller is configured to notify the occupant of the agent function portion that is fixed to be fixedly selected by the selector, by using the output.

2. The agent apparatus according to claim 1, wherein the history information has a record including a content of an executed service, an agent function portion as a provision source, and information indicating a quality of the service, and
wherein the selector is configured to select the agent function portion corresponding to a record in which a quality of the service is high among records in which information indicating the occupant's speech is coincident with an executed service, as an agent function portion making a response to the occupant's speech in the vehicle by outputting the voice response from the output.

3. The agent apparatus according to claim 1, wherein the notification controller is configured to notify the occupant of the agent function portion that is fixed to be fixedly selected by the selector, by using the output, between the occupant's speech and provision of the service.

4. The agent apparatus according to claim 1, wherein the notification controller is configured to notify the occupant of the agent function portion that is fixed to be fixedly selected by the selector, by using the output, after the service is provided.

5. The agent apparatus according to claim 1, wherein a phrase used for starting is set for each of the plurality of agent function portions, and
wherein, in a case where the agent function portion providing a service requested according to a part other than the phrase is fixed in the occupant's speech although the phrase is included in the occupant's speech, the selector is configured to select the fixed agent function portion as an agent function portion making a response to the occupant's speech in the vehicle.

6. The agent apparatus according to claim 1, wherein a phrase used for starting is set for each of the plurality of agent function portions, and
wherein the selector is configured to select the agent function portion in a case where the phrase is not included in the occupant's speech.

7. An agent apparatus control method of causing a computer to:
start a plurality of agent function portions each providing a service including outputting a voice response in response to an occupant's speech in a vehicle;
refer to history information indicating a history of a quality of a service executed by each of the plurality of agent function portions with respect to a content of the occupant's speech;
select an agent function portion making a response to the occupant's speech in the vehicle from among the plurality of agent function portions;
notify the occupant of various pieces of information by using the output;
correlate the service that can be provided by the agent function portion with an agent function portion that can provide the function with a highest service quality;
in a case where the function identified for the occupant's speech is included in the correlated information, transition from a state of dynamically selecting the agent function portion that provides a service in response to a certain speech to a state of fixedly selecting the agent function portion that can provide the function with the highest service quality;
in a case where the function identified for the occupant's speech is not included in the correlated information, select the agent function portion that responds to the occupant's speech among the plurality of agent function portions based on the history information; and
to notify the occupant of the agent function portion that is fixed to be fixedly, by using the output.

8. A non-transitory computer-readable storage medium storing a program causing a computer to: start a plurality of agent function portions each providing a service including outputting a voice response in response to an occupant's speech in a vehicle;
refer to history information indicating a history of a quality of a service executed by each of the plurality of agent function portions with respect to a content of the occupant's speech;
select an agent function portion making a response to the occupant's speech in the vehicle from among the plurality of agent function portions;
notify the occupant of various pieces of information by using the output;
correlate the service that can be provided by the agent function portion with an agent function portion that can provide the function with a highest service quality;
in a case where the function identified for the occupant's speech is included in the correlated information, transition from a state of dynamically selecting the agent function portion that provides a service in response to a certain speech to a state of fixedly selecting the agent function portion that can provide the function with the highest service quality;
in a case where the function identified for the occupant's speech is not included in the correlated information, select the agent function portion that responds to the occupant's speech among the plurality of agent function portions based on the history information; and
to notify the occupant of the agent function portion that is fixed to be fixedly, by using the output.

* * * * *